United States Patent [19]

Hovey

[11] Patent Number: 4,526,504

[45] Date of Patent: Jul. 2, 1985

[54] PUSH-PULL DE-TIERING SYSTEM

[76] Inventor: Gordon E. Hovey, 1333 Bloor St. E., Apt. 805, Mississauga, Ontario, Canada, L4Y 3T6

[21] Appl. No.: 507,001

[22] Filed: Jun. 23, 1983

[51] Int. Cl.³ .............................................. B60P 1/02

[52] U.S. Cl. ...................................... 414/661; 414/32; 414/662

[58] Field of Search .................... 414/32, 35, 86, 497, 414/659, 661, 662, 663

[56] References Cited

U.S. PATENT DOCUMENTS

| | | | |
|---|---|---|---|
| 3,187,917 | 6/1965 | Miller | 414/659 X |
| 3,516,641 | 6/1970 | Ferguson | 414/497 X |
| 3,850,116 | 11/1974 | Mackes | 414/661 X |
| 4,065,012 | 12/1977 | Rocco | 414/497 X |

*Primary Examiner*—Robert J. Spar
*Assistant Examiner*—Janice Krizek

[57] ABSTRACT

A fork-lift type truck for handling pallet loads comprising a plurality of superimposed layers mounted on slip sheets is provided with a push-pull load displacer having the capability for vertical movement substantially independently of the truck platform, to permit selective build-up or dispersal of the load, one or more layers at a time, using slip sheets for each segment of the load. The push-pull load displacer is of slender construction, including a pivotable actuator, to achieve a shallow envelope when retracted, for ready passage downwardly into the restricted space available between the pallet load and the load carrying structure of the machine.

6 Claims, 6 Drawing Figures

PUSH-PULL DE-TIERING SYSTEM

BACKGROUND OF THE INVENTION

The use of fork lift trucks incorporating push-pull capability for use with loads mounted upon slip sheets is well known, as exemplified in U.S. Pat. No. 4,205,938 Olson June 3rd, 1980; and No. 4,274,794, Olson, June 23rd, 1981, both of which illustrate fork lift type vehicles incorporating push-pull devices, including the provision of slip-sheet clamp means for drawing loaded slip sheets into the truck main platform.

A particular drawback with this prior art type of arrangement has been that such vehicles have been restricted to use with unitary loads, generally a loaded pallet, or by loading onto a platen.

The building up of loads or dispersal of partial loads by sole use of the truck equipment has not previously been feasible.

SUMMARY OF THE INVENTION

The present invention provides a push-pull assembly mounted for vertical positioning independently of the lift truck main platform, or platen or forks.

The invention further provides a push-pull assembly of slim silhouette to permit repositioning of the assembly in interposed relation between the truck structure and a predetermined portion of the load, to permit selective loading and unloading of partial loads.

The invention further provides a method of selective building up and dispersing of loads comprising a plurality of layers mounted on a plurality of slip sheets.

The present invention provides a lift-truck having prime mover means to power the operation thereof; load support means projecting from the truck; substantially vertical mast means; carriage means displaceably secured to the mast means for up and down displacement thereon having the load support means secured thereto; main hoisting means for selectively positioning the load support means at a desired height for the addition and removal of load therefrom; push-pull load displacer means mounted on the truck above the load support means, secondary hoisting means for positioning the push-pull means at a predetermined height relative to a load in load displacing relation.

The invention further provides a strap-on push-pull adapted for attachment to a standard fork lift truck, including mast means for securement to the truck carriage, having the slender profile push-pull mounted thereon for use in co-operation with the truck main load platform.

The subject arrangement includes a slip-sheet gripper means operable by the push-pull actuating means.

The invention further provides push pull displacer means including foldable linkage means having a first plurality of foldable links with horizontally hinged connecting joints therefor and a second plurality of substantially vertically hinged foldable links supporting a push frame portion of the push-pull means.

The invention further provides push-pull actuating means having a double acting cylinder pivotally secured to one link of the foldable links, with a piston rod of the actuating means pivotally connected to an adjoining link whereby upon contraction of the piston rod within the cylinder to produce closure of the links, the cylinder is swung into a retracted position in substantial alignment with the links, when in a folded condition, to provide a slim silhouette to the push-pull displacer means, facilitating insertion thereof behind a load for substantially unrestricted upward and downward displacement to a selected position behind the load.

BRIEF DESCRIPTION OF THE DRAWINGS

Certain embodiments of the invention are described, reference being made to the accompanying drawings, wherein.

DESCRIPTION OF THE PREFERRED EMBODIMENT

Figure 1:
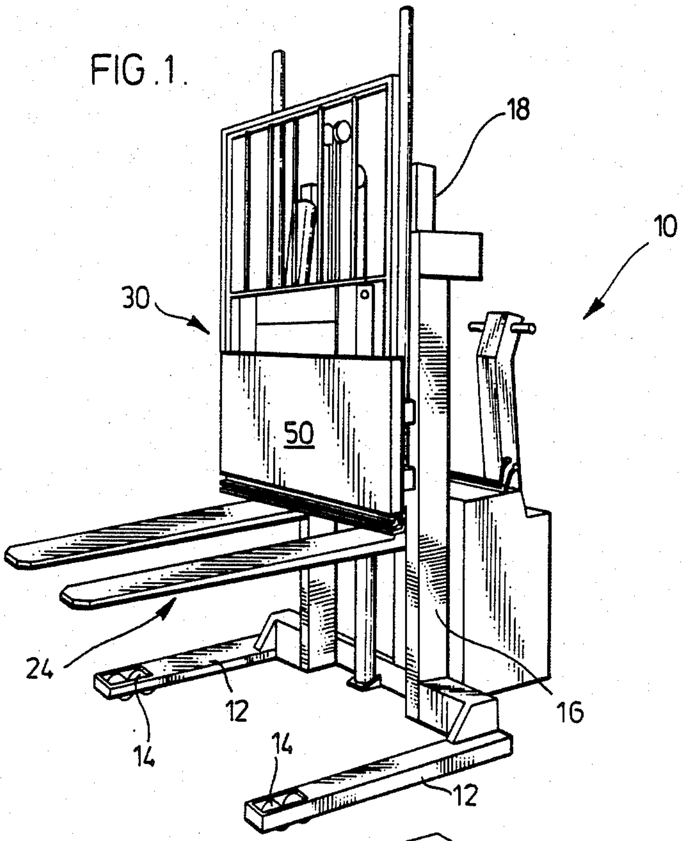
FIG. 1 is a general view of one type of electric fork lift truck incorporating a push-pull in accordance with the present invention.
Figure 2:
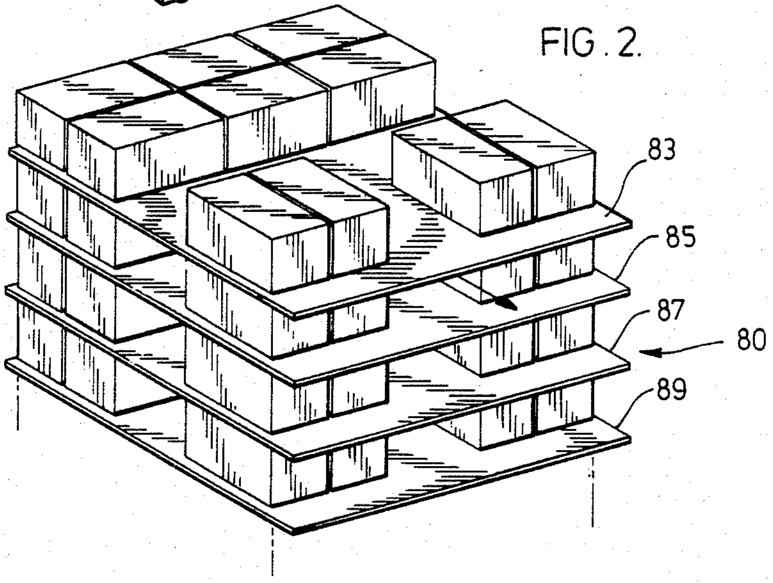
FIG. 2 is a general view of a multiple layer type load on a plurality of slip sheets which can be selectively displaced by the subject device.

Turning to FIG. 1, there is illustrated a manually controlled "walker" electric fork lift truck 10 of well known type having a pair of feet 12 carried on rollers 14. The feet 12 are spaced sufficiently widely apart to straddle a standard pallet, or a load of equivalent width.

Figure 6:
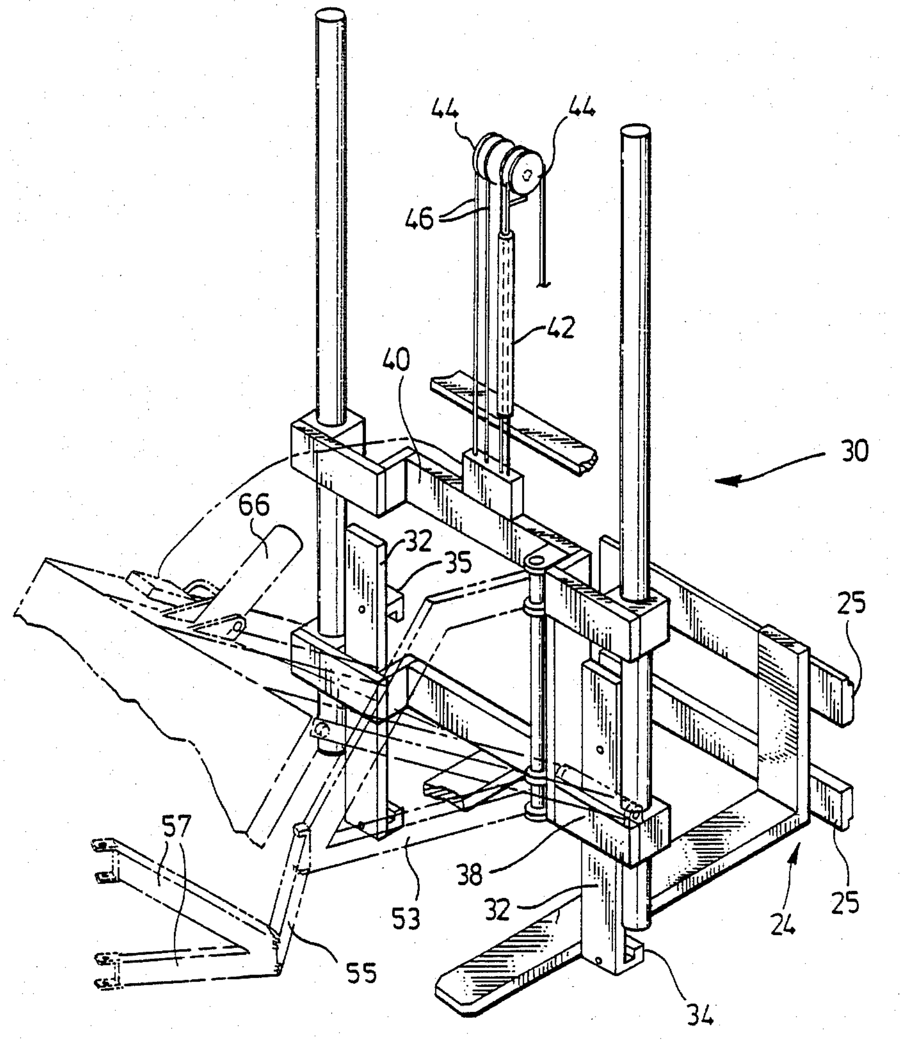
FIG. 6 is a general view of support elements of the push-pull in relation to the fork attachment of a standard truck.

Mast structure 16 carries a carriage 18 vertically slideably mounted thereon, being suported by a pair of support chains 20 (FIG. 3) and actuated by a main hoisting cylinder 22 in the usual fashion. A standard fork attachment 24 (FIGS. 1 and 6) is illustrated, being attached to the carriage 18 for displacement therewith.

Figure 5:
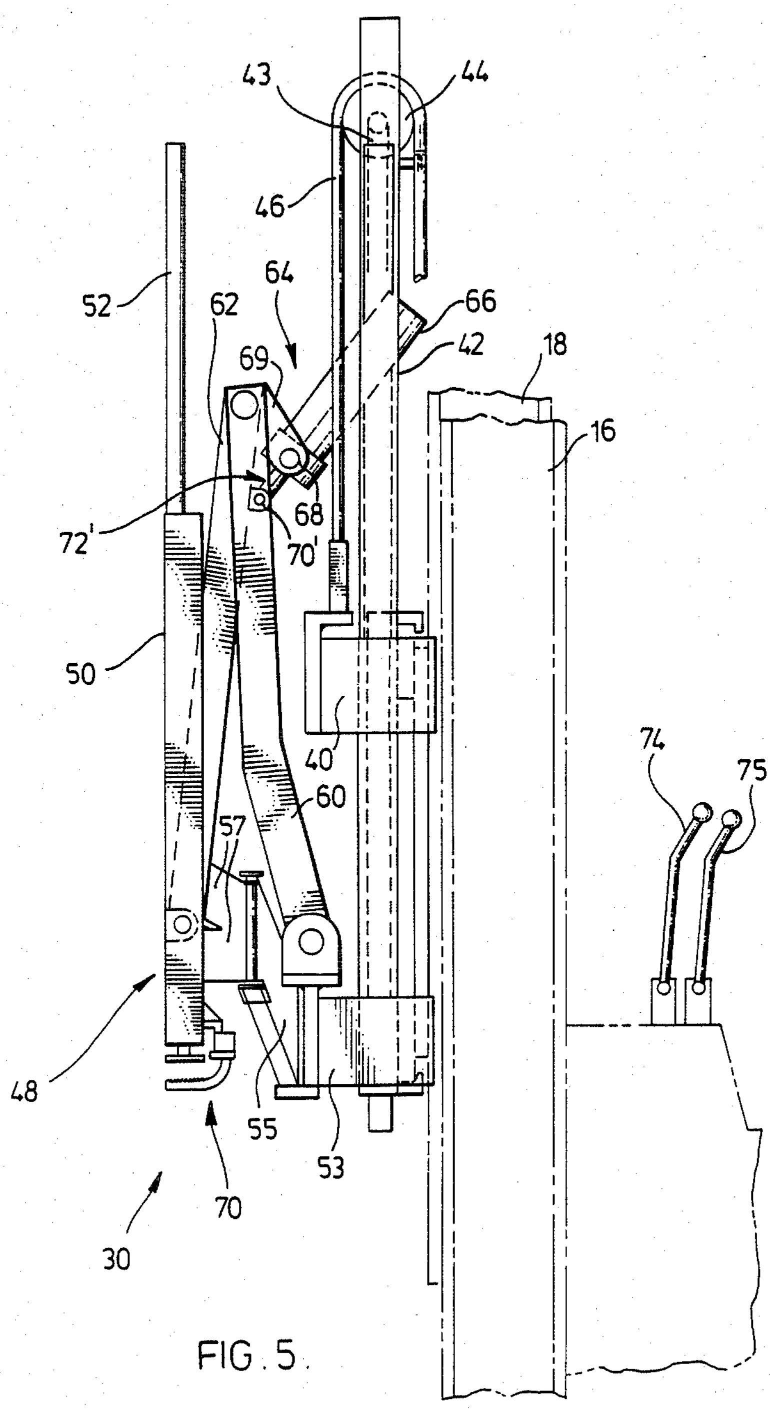
FIG. 5 is a schematic side elevation view showing aspects of the subject push-pull in relation to elements of a fork lift truck.

The preferred push-pull 30 (FIGS. 5 and 6) has attachment brackets 32, 32, with a bottom clamp 34 and top clamp 35 on each of the brackets 32, to engage in clamping relation therewith the transverse bars 25 of the fork attachment 24.

A pair of auxiliary masts 36 secured to the brackets 32 extend upwardly therefrom, having a lower frame 38 and upper frame 40 of the push-pull 30 slideably mounted thereon.

A secondary hoisting cylinder 42 secured to the brackets 32 by frame members (not shown) is connected by its piston 43 and displacer pulleys 44 with a plurality of chains 46 by means of which the push-pull 30 is suspended. The pusher assembly 48 comprises a pusher plate 50 having a safety frame 52 mounted thereover, to contain any misplaced load, as a safeguard to workers.

The assembly 48 is carried by a plurality of vertically pivotted links 53,55,57 (FIG. 6) suitably cranked at the ends and bifurcated where appropriate to fold back, in a retracted position to a very slender profile fitting within a recess provided by the cranked frames 38,40 of the pull-pusher 30.

A pair of folding links 60,62 having horizontal pivot joints serve to keep the face of pusher plate 50 parallel with the main carriage 18.

An actuator 64 has the cylinder 66 thereof pivotted at 68 to a pair of brackets 69 secured to link 60. The piston end $72^1$ of actuator 64 is pivotted at $70^1$ to a pair of brackets secured to the second link 62. Extension of actuator 64 opens the links 60,62 so as to move the push-pull 30 in an outwards, load push-off mode.

Contraction of actuator 64 withdraws push-pull 30 in a load-drawing direction, while folding the links 60,62 into mutual nesting relation and pivotting the cylinder 66 upwardly in vertically retracted, nested relation, as a portion of the slim silhouette of the retracted push-pull 30.

Figure 4:
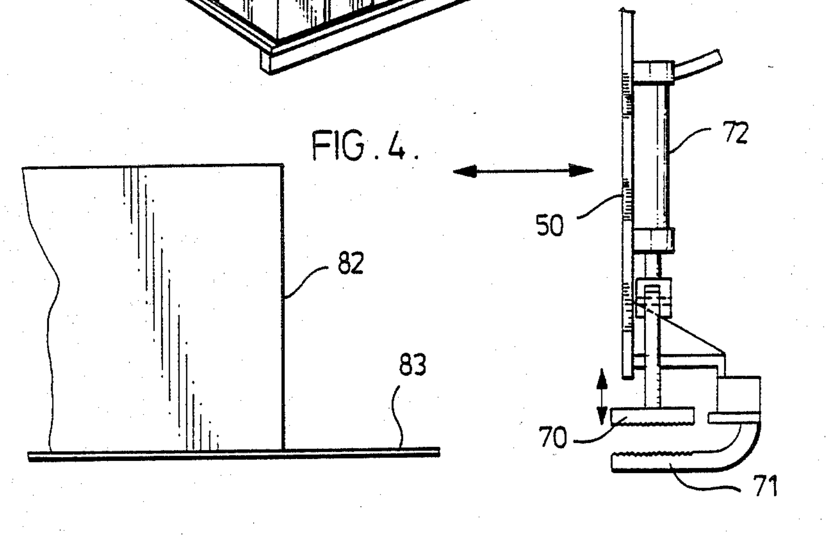
FIG. 4 is a schematic sideview showing the front of the push-pull approaching a loaded slip sheet.

A slip-sheet gripper 70 of well known type has a pair of hydraulic actuators 72 (FIG. 4) connected by way of a sequence valve with the hydraulic circuit of the actuator 64, which is controlled by hydraulic control handles 74,75 in the usual fashion.

The load stack 80 has a plurality of layers or tiers 82,84,86,88 etc., each supported on its respective slip sheet 83,85, 87, 89 etc.

Figure 3:
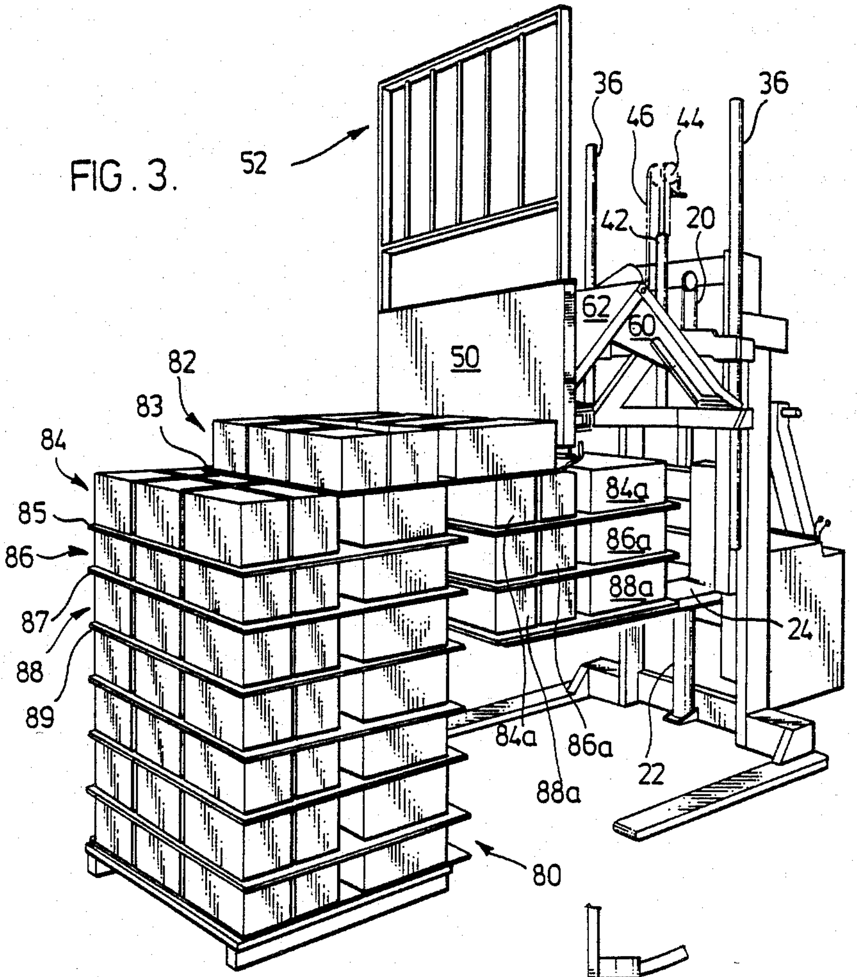
FIG. 3 shows a general view of the subject device displacing a single tier of a load.

Referring to FIG. 3, the fork lift has a 3-tier partial load, *88a,86a,84a* mounted thereon.

Aligning the machine with the stack 80 in the manner shown in FIG. 3 and gripping the slip sheet 83 between gripper 70 and its curved foot 71, by retracting push-pull 30, the top tier 82 is drawn on to the top of tier 84, to build the load. In the retracted condition of the push-pull 30, it can be traversed vertically up or down in the residual space between pusher plate 50 and the front face of the load, whereby any desired number of tiers of the truck load can be displaced, by pushing off.

Correspondingly, working under conditions wherein the initial pallet load constituting the stack may be limited to a particular number of tiers, using the system in accordance with the present invention, the stack may be selectively increased tier by tier, or as required, within the limits of capability of the machine.

Similarly, in building up a load, the top one or two tiers may be extracted from any selected stack or stacks, and assembled as a unitary load upon the fork lift.

FIG. 3 shows a standing stack 80 mounted on a pallet, while on the fork lift, the load is carried by a rigid support sheet such as a sheet of plywood, supported on the forks. It will be understood that in most instances the fork lift would utilize a pallet, in order to provide the ready capability of depositing and re-lifting the load in toto.

What I claim by Letters Patent of the United States is:

1. A lift truck having prime mover means to power the operation thereof; load support means projecting from the truck to receive in use a load comprising superimposed tiers having slip sheets interposed between at least some of said tiers; substantially vertical mast means; carriage means displaceably secured to the mast means for up and down displacement thereon having said load support means secured thereto; main hoisting means for selectively positioning said load support means at a desired height for the addition and removal of load therefrom; push-pull load displacer means including slip sheet gripper means mounted on said truck, above said load support means for displacement, when in a retracted condition, vertically behind said tiers, secondary hoisting means for positioning said push-pull means at a predetermined height relative to a selected said tier of said load, and actuating means for operating said push-pull means in load displacing relation.

2. The lift truck as claimed in claim 1 including auxiliary mast means secured to said carriage means having said push-pull means displaceably secured thereto.

3. The lift truck as claimed in claim 1, said push-pull displacer means including a push frame having said gripper means adjustably positioned in sheet gripping relation therebeneath, foldable linkage means connecting said push frame to said carriage means, said push-pull actuating means including a double acting cylinder pivotally secured to the linkage means.

4. The lift truck as claimed in claim 1, said foldable linkage means having a first plurality of foldable linkage means with horizontally hinged connecting joints therefor; and a second plurality of substantially vertically hinged foldable linkage means supporting a push frame portion of said push-pull means.

5. The lift truck as claimed in claim 4, said foldable linkage means telescoping to a restricted compass, said first linkage means providing lateral stability to a push frame portion of said push-pull means and said second linkage means providing a vertical support and stability to said push frame portion, said push-pull means having a recessed frame to receive said second linkage means in folded relation therein.

6. The lift truck as claimed in claim 4, said push-pull actuating means comprising a double acting cylinder pivotally secured to one of said horizontally hinged linkage means, having a piston rod of the actuating means pivotally connected to another said horizontally hinged linkage means, whereby upon contraction of said piston rod within said cylinder, to produce closure of said first linkage means said cylinder is swung into substantial alignment with said first linkage means, to permit passage of said push-pull means upwardly and downwardly behind a load carried by said load support means.

* * * * *